(12) United States Patent
Isono

(10) Patent No.: US 7,926,818 B2
(45) Date of Patent: Apr. 19, 2011

(54) GASKET AND STRUCTURE FOR SEALING BETWEEN TWO MEMBERS

(75) Inventor: Eiji Isono, Fujisawa (JP)

(73) Assignee: Nok Corporation, Tokyo (JP)

( * ) Notice: Subject to any disclaimer, the term of this patent is extended or adjusted under 35 U.S.C. 154(b) by 606 days.

(21) Appl. No.: 11/883,923

(22) PCT Filed: Jan. 19, 2006

(86) PCT No.: PCT/JP2006/300694
§ 371 (c)(1),
(2), (4) Date: Aug. 8, 2007

(87) PCT Pub. No.: WO2006/085435
PCT Pub. Date: Aug. 17, 2006

(65) Prior Publication Data
US 2008/0157485 A1    Jul. 3, 2008

(30) Foreign Application Priority Data
Feb. 8, 2005 (JP) ................. 2005-031619

(51) Int. Cl.
*F16J 15/02* (2006.01)
(52) U.S. Cl. ......... 277/630; 277/637; 277/644; 220/378
(58) Field of Classification Search .............. 277/628, 277/630, 637, 640, 644; 220/378
See application file for complete search history.

(56) References Cited

U.S. PATENT DOCUMENTS

| | | | | |
|---|---|---|---|---|
| 4,347,947 | A | * | 9/1982 | Hammes ................. 220/378 |
| 5,368,182 | A | * | 11/1994 | Schutz ................. 220/319 |
| 6,854,739 | B2 | * | 2/2005 | Schleth et al. ........... 277/642 |

FOREIGN PATENT DOCUMENTS

| | | |
|---|---|---|
| EP | 1 538 375 | 6/2005 |
| FR | 2681396 A1 * | 3/1993 |
| JP | S49-16187 | 4/1974 |
| JP | S49-100211 | 8/1974 |
| JP | 11-294593 | 10/1999 |
| JP | 2004-036630 | 2/2004 |
| WO | 2004/025148 | 3/2004 |

* cited by examiner

*Primary Examiner* — Shane Bomar
*Assistant Examiner* — Robert E Fuller
(74) *Attorney, Agent, or Firm* — Jacobson Holman PLLC

(57) ABSTRACT

A gasket to securely contact a box type body when both a body and a cover are downsized and thinned. Fluid leakage is prevented through a seal by lessening repulsion of the seal at the time of sealing clearance between. A clearance between the box type body and the cover is made such that a main body is adhered to a bottom surface of the cover having a peripheral wall. A step face is formed by the main body and a lip portion formed at the tip side of the main body. A contact surface is formed by a side wall of the main body and a peripheral wall. The step surface is positioned outside with respect to the lip portion.

4 Claims, 7 Drawing Sheets

GASKET AND STRUCTURE FOR SEALING BETWEEN TWO MEMBERS

This is a national stage of PCT/JP06/300694 filed Jan. 19, 2006 and published in Japanese.

BACKGROUND OF THE INVENTION

1. Field of Invention

The present invention relates to a gasket for sealing between a box type body for accommodating an electronic device, particularly a hard disc drive, and a cover, and a structure for sealing between two members by using the gasket.

2. Description of the Conventional Art

In conventional devices, a box type body for accommodating a hard disc drive used for an electronic device employs a casting. However, there is a tendency in recent years that a contact surface of the gasket for sealing between the box type body and a cover and a width of the gasket have been narrowed, in accordance with a downsizing of electronic devices and the hard disc drive used therein.

It is proposed that a sealing performance between a box type body and a gasket is increased by setting a cross sectional shape of the gasket to a shape of the device constituted by a base portion and a protruding portion. Further, a shape is specifically a rate between a width and a height of the gasket or the like.

However, it is required to reduce a space of an installation surface of the gasket and narrow the gasket itself in accordance with a further downsizing of electronic devices and the hard disc drive used therein. In addition, there is the necessity of switching the box type body from the conventional casting to a downsized thin plate product of a sheet metal press molding. As a result, a width of an end surface of a peripheral wall of the box type body with which the gasket is brought into contact is extremely limited. There is a risk that a lip portion is not normally brought into contact with the box type body in the gasket having the shape mentioned above, and there is fear that sealing performance is lowered.

Further, when the cover is made from the thin plate, an excessive deflection deformation is generated in the cover between fixing screws due to a gasket repulsion load at a time of assembling. There is a problem that the sealing performance is lowered by a contact failure between the gasket and the sealed surface at a position where the deflection deformation of the cover is the most.

Patent Document 1: Japanese Unexamined Patent Publication No. 2004-036630

SUMMARY OF THE INVENTION

Problem to be Solved by the Invention

The present invention is made by taking the points mentioned above into consideration, and an object of the present invention is to provide a gasket in which it is possible to securely bring a box type body into contact with a gasket even when both a box type body for accommodating a hard disc drive and a cover are downsized and formed as a thin plate product in accordance with a sheet metal press molding because of a downsizing of the hard disc drive. Repulsion force is small at a time of sealing between the box type body and the cover, and the cover is not excessively deflected, thereby preventing a seal leak from being generated, and a structure is provided for sealing between two members by using the gasket.

Means for Solving the Problem

In order to achieve the object mentioned above, in accordance with a first aspect of the present invention, there is provided a gasket for sealing a gap of two facing members, in which a main body is adhered to a bottom surface of one member having a peripheral wall, and a step surface is formed by the main body. A lip portion is provided at a leading end side therefrom, wherein a contact surface is formed by a side wall of the main body and the peripheral wall, and the step surface is positioned at the peripheral wall side with respect to the lip portion.

Further, in accordance with a second aspect of the present invention, there is provided a gasket as recited in the first aspect, wherein a position of a burr generated by an overflow is brought into inside contact with the peripheral wall of the one member, at a time when the gasket is adhered to the bottom surface of the one member by integral molding.

Further, in accordance with a third aspect of the present invention, there is provided a structure for sealing between two members, wherein when the gasket as recited in the first aspect or the second aspect is brought into contact with a peripheral wall of the other member, a position of a center line of a cross section of the lip portion of the gasket is positioned at an inner side from the position of a center line of a cross section of a leading end surface of the peripheral wall.

Further, in accordance with a fourth aspect of the present invention, there is provided a structure for sealing between two members, wherein when the gasket as recited in the first aspect or the second aspect is brought into contact with a peripheral wall of the other member, a relationship "$(A/2)+B \leq C, B \geq 0$" is established for a width A of a leading end surface of a cross section of the peripheral wall of the other member, a distance B between an outer end surface of the peripheral wall and an inner end surface of the peripheral wall of the one member, and a distance C from a position of a center line of a lip portion of the gasket to an inner end surface of the peripheral wall of the one member in a cross section.

Further, in accordance with a fifth aspect of the present invention, there is provided a structure for sealing between two members as recited in the third aspect or the fourth aspect, wherein the inner end surface of the leading end portion of the peripheral wall of the other member is constituted by a tapered surface which is inclined with respect to an outer side.

Effect of the Invention

The present invention achieves the following effects.

In the case that a dispersion within a dimensional tolerance is small, it is possible to form the seal surface by bringing the leading end surface of the peripheral wall of the other member into contact with the lip portion which easily deforms with respect to the compression, so as to be deflected. In contrast, in the case that the dispersion is large, it is possible to form the seal surface by bringing the leading end surface of the peripheral wall of the other member into contact with the portion in which the gasket is deflected with respect to the inner side so as to be inclined. Accordingly, even if the leading end surface of the peripheral wall of the other member, which is downsized and formed as the thin plate product in accordance with sheet metal pressing, is deviated from the lip portion of the gasket due to dispersion, it is possible to bring the leading end surface into contact with the gasket, and it is possible to seal between the two members.

Further, since the gasket is deflected to the inner side so as to be brought into contact with the inclined portion, at a time when the leading end surface of the peripheral wall of the other member is deviated from the lip portion of the gasket due to dispersion, it is possible to seal at a low surface pressure, reduce a repulsion load applied to the gasket, make the deflection of the one member small even if both the one member and the other member are downsized and formed as the thin plate products in accordance with sheet metal press work, and it is possible to seal between the two members.

Further, since the seal pressure can be applied to the bottom surface and the peripheral wall of the one member to which the gasket is adhered, it is possible to reduce the seal pressure so as to make the seal pressure applied to the bottom surface small, whereby it is possible to make deflection of the one member small and to seal between the two members.

Accordingly, the effects can be particularly achieved in the case of being used in the structure in which both members are downsized and formed as thin plate products in accordance with sheet metal press molding.

BEST MODE FOR CARRYING OUT THE INVENTION

A description will be given below of a preferable embodiment in accordance with the present invention by exemplification with reference to the accompanying drawings. In this case, a scope of the invention is not limited to the contents described in the embodiment unless a particularly limited description is given.

Figure 1:
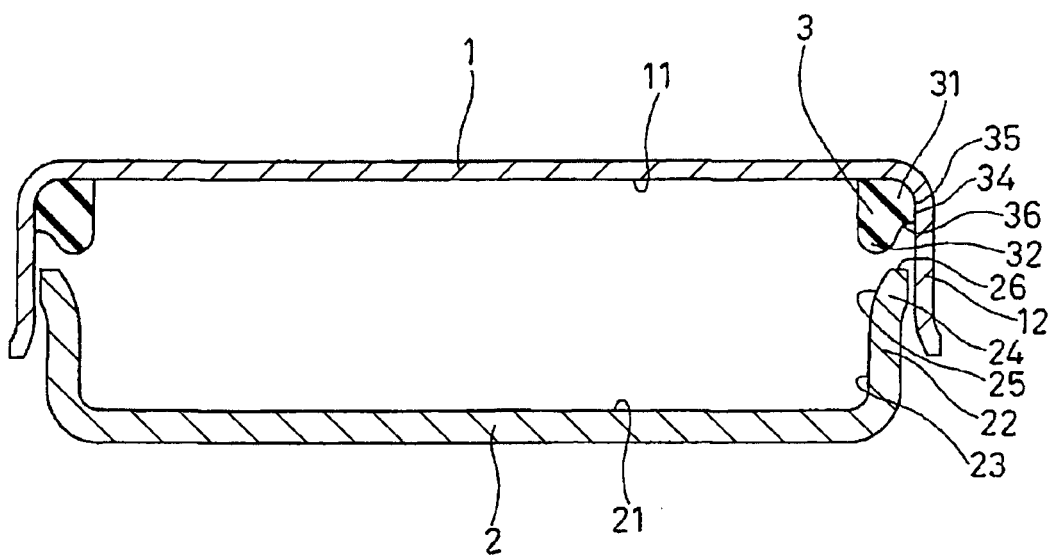
FIG. 1 is a cross sectional view showing an assembled state between two members in which a gasket in accordance with the present invention is used.

As shown in FIG. 1, a cover 1 corresponding to one member is formed by sheet metal press work, and has a peripheral wall 12 around a bottom surface 11. An aluminum plate, a steel material such as stainless steel or the like is employed as the cover 1.

A box type body 2 corresponding to the other member is formed by sheet metal press work, and an electronic device part is installed therein. A peripheral wall 22 is provided around a bottom surface 21, and an inner end surface 23 of a leading end portion 24 of the peripheral wall 22 has a tapered surface 25 expanding to an outer side. The box type body is made of an aluminum plate, a steel plate such as a stainless steel plate or the like.

Figure 2:
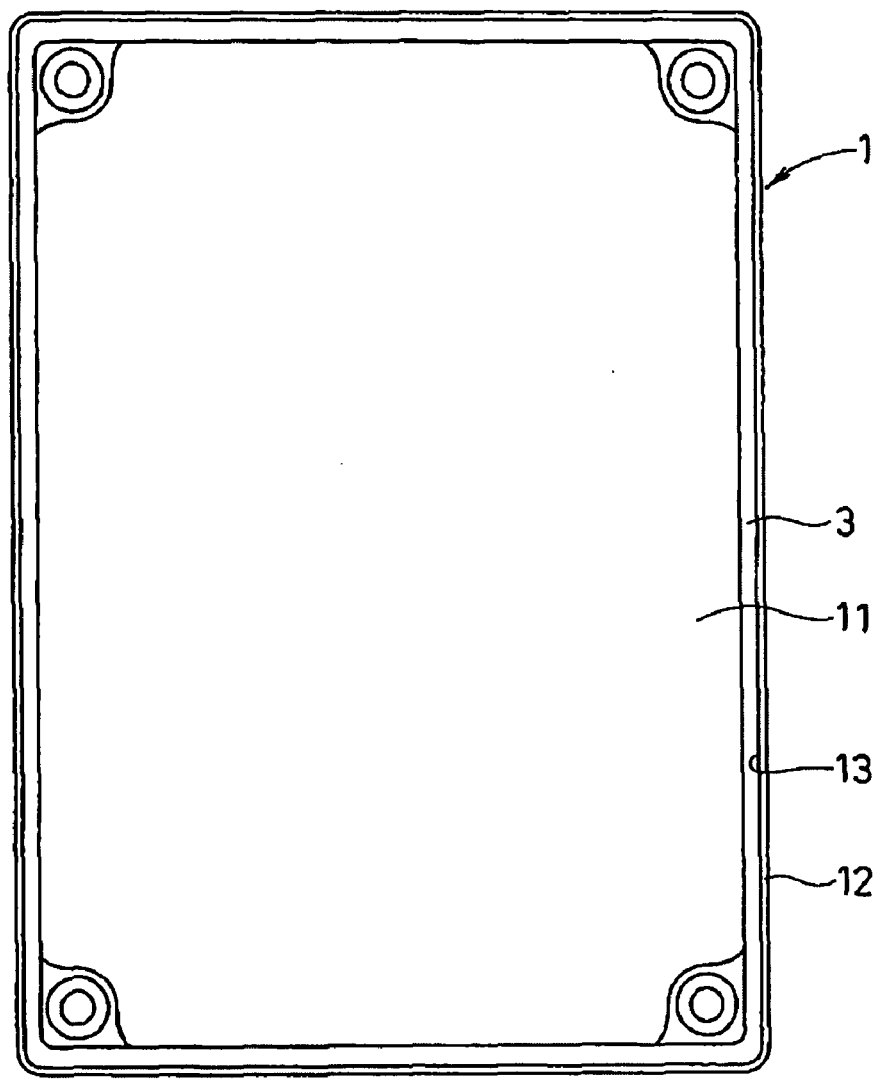
FIG. 2 is a plan view showing a state in which the gasket in accordance with the present invention is installed.
Figure 3:
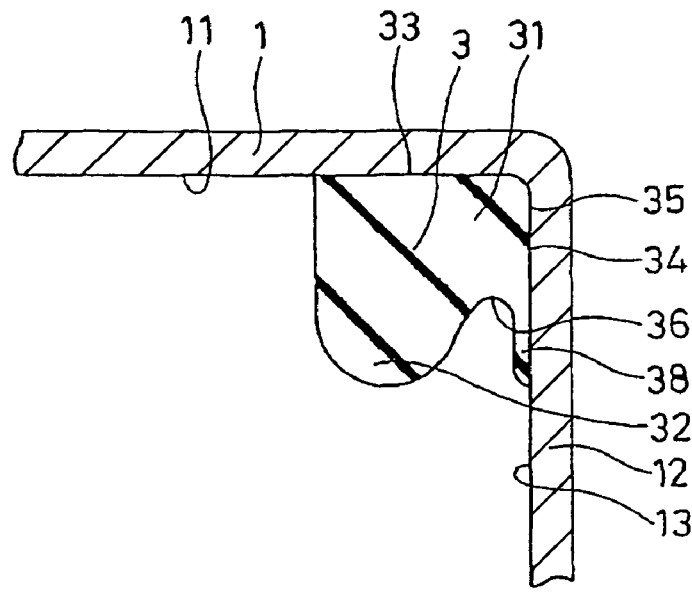
FIG. 3 is an enlarged cross sectional view of a gasket portion in FIG. 1.

As shown in FIGS. 2 and 3, a gasket 3 is arranged over a whole circumference in an endless shape on an inner end surface 13 of the peripheral wall 12 of the cover 1 along a peripheral direction. The gasket 3 is provided with a main body 31 and an integral lip portion 32. A bottom surface 33 of the main body 31 is adhered to the bottom surface 11 of the cover 1. A contact surface 35 is formed over a whole circumference by a side wall 34 of the main body 31 and the inner end surface 13 of the peripheral wall 12 of the cover 1. The lip portion 32 is positioned at a leading end side (a box type body side) with respect to the main body 31 in such a manner as to be brought into contact with a leading end surface 26 of the peripheral wall 22 of the box type body 2 at a time of being assembled with the box type body 2. A step surface 36 is formed by the cross sectional width being made narrower in the lip portion 32 than in the main body 31. The step surface 36 is arranged closer to a peripheral wall 12 side (an outer side) of the cover 1 than the lip portion 32.

Further, a burr 38, which is generated by an overflow at a time of adhering the gasket 3 to the cover 1 in accordance with an integral molding, is contacted with the inner end surface 13 of the peripheral wall 12 of the cover 1.

Figure 4:
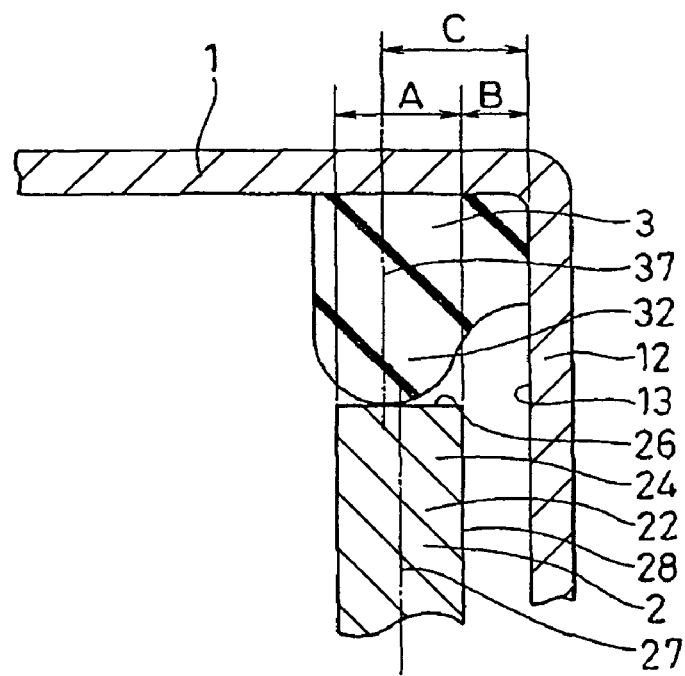
FIG. 4 is an explanatory view showing a state in which the gasket in accordance with the present invention is brought into contact with an opposing member.

Further, as shown in FIG. 4, at a time of assembling the cover 1, to which the gasket 3 is adhered, and the box type body 2 corresponding to the opposing member, a center line 37 of the lip portion 32 in a cross section comes to an inner side of a center line 27 of the leading end surface 26 of the peripheral wall 22 of the box type body 2.

In other words, a relation "$(A/2)+B \leq C$, $B \geq 0$" is established among a width A of the leading end surface 26 of the peripheral wall 22 of the box type body 2 in cross section, a distance B between an outer end surface 28 of the leading end portion 24 of the peripheral wall 22 of the box type body 2 and an inner end surface 13 of the peripheral wall 12 of cover 1, and a distance C from the center line 37 of the lip portion 32 of the gasket 3 in cross section to the inner end surface 13 of the peripheral wall 12 of the cover 1.

Figure 5:
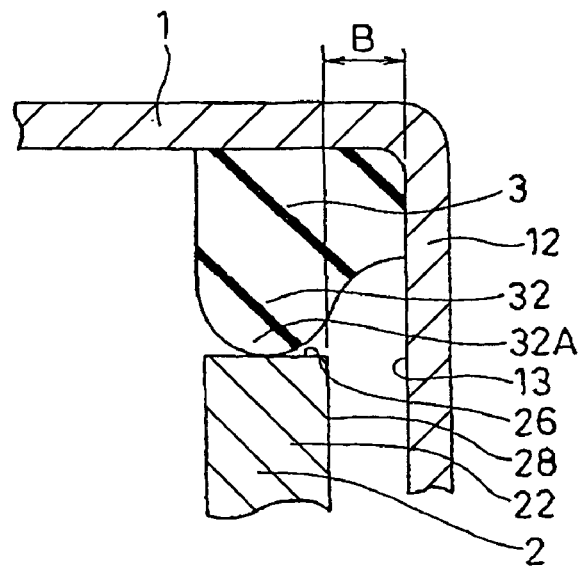
FIG. 5 is an explanatory view showing a state in which the gasket in accordance with the present invention is brought into contact with the opposing member.
Figure 6:
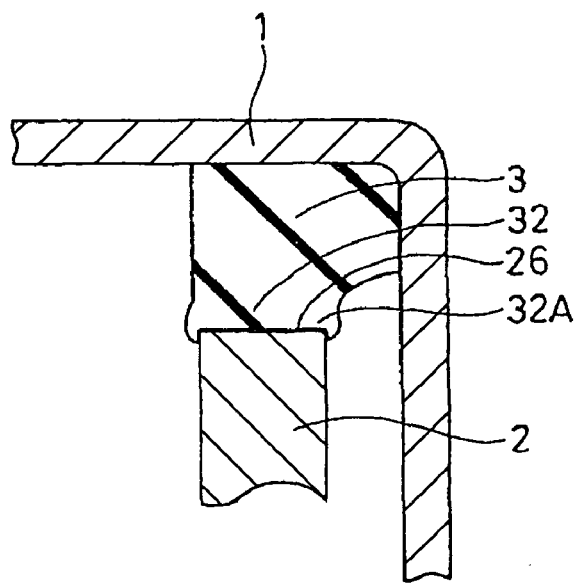
FIG. 6 is an explanatory view showing a state in which the gasket in accordance with the present invention is brought into contact with the opposing member.

In accordance with the structure mentioned above, at a time of assembling the cover 1, to which the gasket 3 is adhered, and the box type body 2 corresponding to the opposing member, the center line 27 of the leading end surface 26 of the peripheral wall 22 of the box type body 2 is provided in such a manner as to be always positioned at the outer side with respect to the center line 37 of the lip portion 32 of the gasket 3, even in the case where the distance B between the outer end surface 28 of the peripheral wall 22 of the box type body 2 and the inner end surface 13 of the peripheral wall 12 of the cover 1 is enlarged, as shown in FIG. 5. Accordingly, as shown in FIG. 6, the leading end surface 26 of the peripheral wall 22 of the box type body 2 is brought into contact with the leading end portion 32A of the lip portion 32. Therefore, the lip portion 32, which is easily deformed by compression, is deflected, while the seal surface is formed so as to make it possible to securely be sealed. Further, since sealing is made at a low surface pressure, a repulsion load is low.

Figure 7:
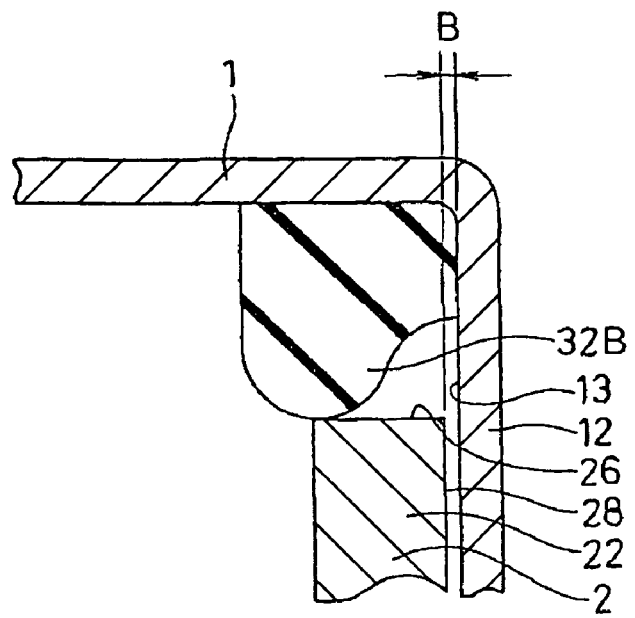
FIG. 7 is an explanatory view showing a state in which the gasket in accordance with the present invention is brought into contact with the opposing member.
Figure 8:
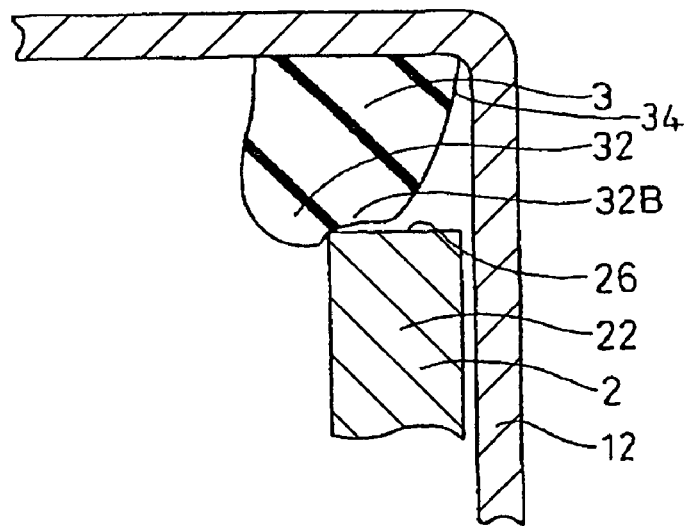
FIG. 8 is an explanatory view showing a state in which the gasket in accordance with the present invention is brought into contact with the opposing member.

Further, in the case that the dispersion within the dimensional tolerance is large and the distance B becomes small as shown in FIG. 7, since the side wall 34 of the gasket 3 is only brought into contact with the peripheral wall 12 of the cover 1, and the side wall 34 is inclined to the inner side, the leading end surface 26 of the peripheral wall 22 of the box type body 2 is brought into contact with the side portion 32B of the lip portion 32, and the seal surface is formed so as to make it possible to be securely sealed, as shown in FIG. 8. Further, since sealing is made at low surface pressure, a repulsion load is low. Particularly, in the case that the inner end surface 23 of the leading end portion 24 of the peripheral wall 22 of the box type body 2 is constituted by the outside inclined tapered surface 25, the gasket 3 is brought into contact with the peripheral wall 12 of the cover 1.

In other words, whatever position the leading end surface 26 of the peripheral wall 22 of the box type body 2 exists due to the dispersion within the dimensional tolerance, the leading end surface 26 can be brought into contact with the gasket 3 and the seal surface can be secured. Further, since sealing can be made at low surface pressure, the repulsion load of the gasket 3 becomes small, and deformation of the cover 1 can be made small.

Figure 9:
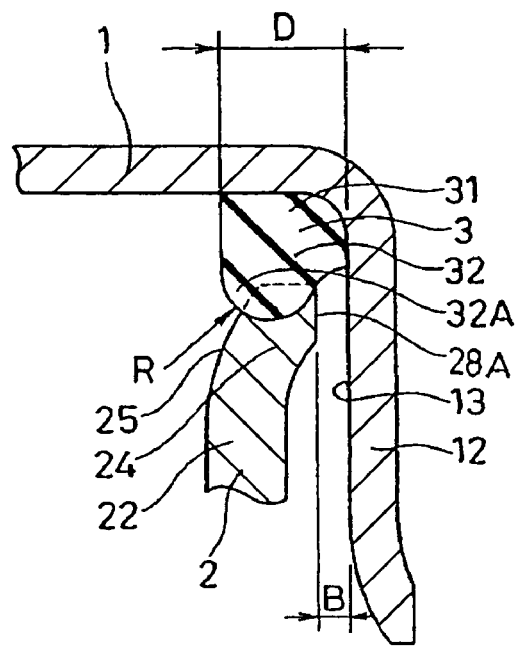
FIG. 9 is an explanatory view showing a state in which the gasket in accordance with the present invention is brought into contact with the opposing member.

In this case, when the inner end surface 23 of the leading end portion 24 of the peripheral wall 22 of the box type body 2 is constituted by the taper surface 25, it is desirable to set the distance B from the outer end surface 28A of the leading end portion 24 of the peripheral wall 22 brought into contact with the gasket 3, in which a total width D of the main body 31 of the gasket 3 is 0.4 mm, and a radius of curvature of the leading end portion 32A of the lip portion 32 is 0.14 mm, to the inner end surface 13 of the peripheral wall 12 of the cover 1 within a range between 0.093 mm and 0.107 mm, as shown in FIG. 9.

Figure 10:
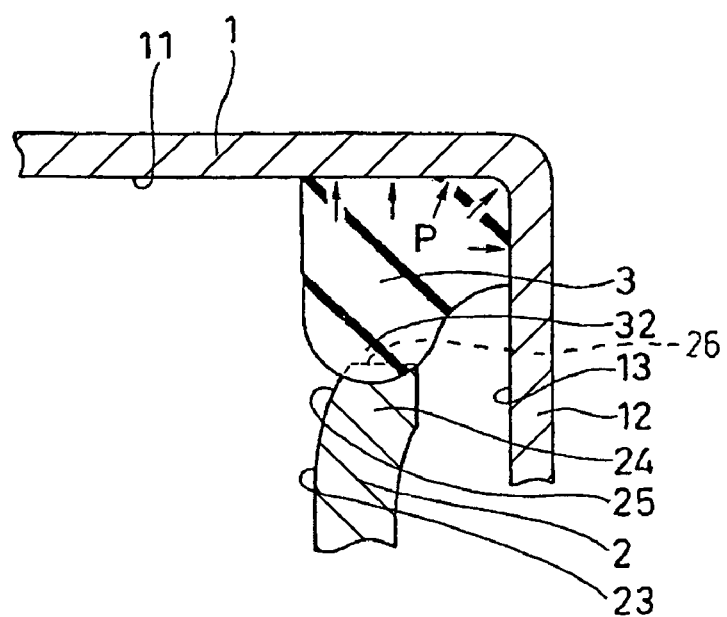
FIG. 10 is an explanatory view showing a state in which the gasket in accordance with the present invention is brought into contact with the opposing member.

Further, since a seal pressure P of the gasket is applied dispersedly to the bottom surface 11 and the inner peripheral surface 13 of the cover 1, as shown in FIG. 10, at a time when the leading end surface 26 of the peripheral wall 22 of the box type body 2 is brought into contact with the lip portion 32 of the gasket 3, the repulsion load of the gasket 3 becomes small, and it is possible to make the deflection of the cover 1 small.

Figure 11:
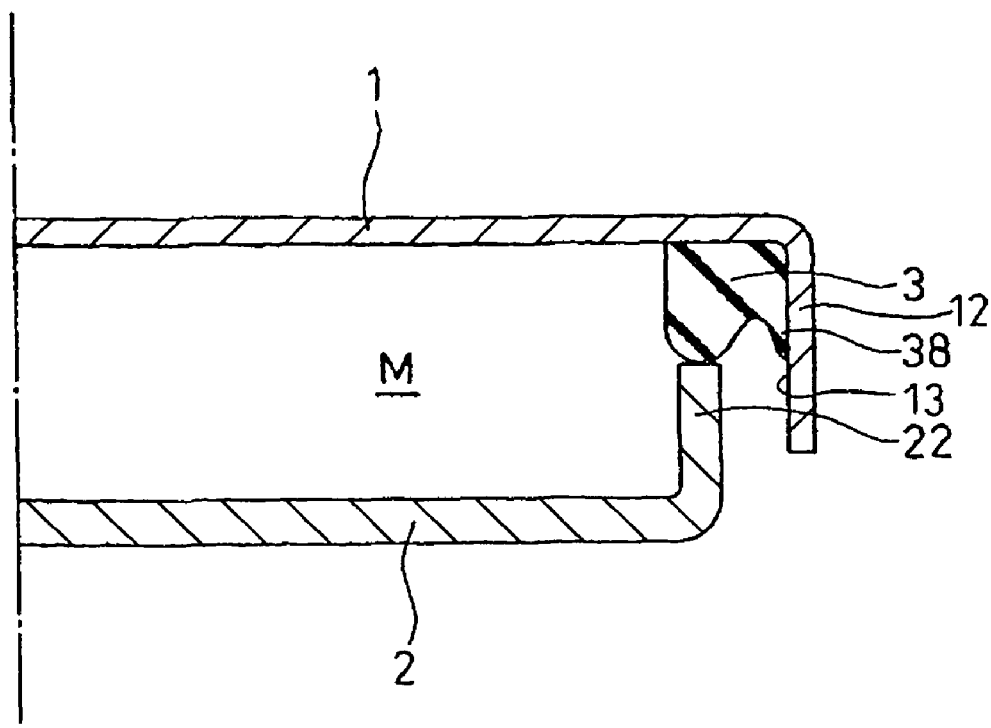
FIG. 11 is an explanatory view showing a state in which the gasket in accordance with the present invention is brought into contact with the opposing member.

Further, since the position of the burr 38 generated by the overflow is inside contacted with the inner peripheral surface 13 of the peripheral wall 12 of the cover 1, at a time of adhering the gasket 3 to the cover 1 in accordance with the integral molding, the burr 38 is positioned at the outer side with respect to the peripheral wall 22 of the box type body 2 in a sealed state, as shown in FIG. 11, so that intrusion of the fallen-off burr 38 into a sealed inner portion M can be prevented.

In the present embodiment, the description is given of the case where the peripheral wall 22 of the box type body 2 is brought into contact with the gasket 3 adhered to the cover 1. However, the present invention can be applied to a case that the gasket 3 is adhered to the box type body 2, and the peripheral wall 12 of the cover 1 is brought into contact therewith.

What is claimed is:

1. A sealed structure comprising
a cover and a box body which face each other, the box body having a U-shape in cross section,
a gasket having a main body and a lip portion, the lip portion being located at a leading end side of said main body, the main body being adhered to a bottom surface of the cover,
a step surface of said gasket formed by said main body and the lip portion,
said step surface being positioned at a peripheral wall side of said cover with respect to said lip portion,
a contact surface of said main body engaged with a peripheral wall of said cover being formed by a side wall of said main body,
an inner end surface of a leading end portion of a peripheral wall of said box body including a tapered surface inclined towards an outer side of the box body,
a single planar surface of said box body located closest to the gasket being spaced by a separation distance from said peripheral wall of said cover,
a seal surface being formed by the leading end surface of the peripheral wall of the box body in contact with the lip portion so that the gasket is deformed at a time of said cover being assembled to said box body, and the seal surface being formed by bringing the leading end surface of the peripheral wall of the box body into contact with a portion of the gasket which is bent towards an inner side of the box body so as to incline the gasket when the gasket is dispersed.

2. The sealed structure as claimed in claim 1, wherein a burr of the gasket is in inside contact with the peripheral wall of said cover, at a time when the gasket is adhered to the bottom surface of said cover.

3. The sealed structure as claimed in claim 1, wherein a position of a centerline of a cross section of the lip portion of said gasket is positioned at an inner side with respect to a position of a centerline of a cross section of the leading end surface of said peripheral wall of the box body when said gasket is brought into contact with a peripheral wall of the box body.

4. The sealed structure as described in claim 1, wherein a relationship of $(A/2)+B \leqq C$, $B \geqq 0$ is established by a width A of the leading end surface of the peripheral wall of the box body, a distance B between an outer end surface of said peripheral wall of said box body and an inner end surface of the peripheral wall of said cover, and a distance C from a position of the centerline of the lip portion of said gasket to the inner end surface of the peripheral wall of said cover.

* * * * *